United States Patent
Crowe et al.

(10) Patent No.: US 7,609,152 B2
(45) Date of Patent: Oct. 27, 2009

(54) ERROR HANDLING FOR MULTI-FUNCTIONAL DISPLAY

(75) Inventors: Paul S. Crowe, Aubrey, TX (US); Chris del Rio, Dallas, TX (US); John W. Espinosa, Aubrey, TX (US)

(73) Assignee: PACCAR Inc, Bellevue, WA (US)

( * ) Notice: Subject to any disclaimer, the term of this patent is extended or adjusted under 35 U.S.C. 154(b) by 244 days.

(21) Appl. No.: 11/844,990

(22) Filed: Aug. 24, 2007

(65) Prior Publication Data
US 2009/0051521 A1  Feb. 26, 2009

(51) Int. Cl.
G09F 9/00 (2006.01)

(52) U.S. Cl. .................. 340/461; 340/425.5; 340/426.1; 340/438; 340/439; 701/29; 701/32

(58) Field of Classification Search .............. 340/425.5, 340/426.1, 428, 426.22, 426.24, 426.25, 340/438, 439, 461; 701/29, 32
See application file for complete search history.

(56) References Cited

U.S. PATENT DOCUMENTS

| | | | |
|---|---|---|---|
| 4,809,177 A | 2/1989 | Windle | |
| 4,970,496 A * | 11/1990 | Kirkpatrick | .................. 340/585 |
| 5,382,942 A | 1/1995 | Raffa | |
| 5,424,720 A * | 6/1995 | Kirkpatrick | .................. 340/585 |
| 5,453,439 A * | 9/1995 | Ple | .............................. 514/459 |
| 5,764,139 A | 6/1998 | Nojima | |
| 5,802,545 A | 9/1998 | Coverdill | |
| 5,880,710 A | 3/1999 | Jaberi | |
| 5,957,986 A | 9/1999 | Coverdill | |
| 6,172,602 B1 | 1/2001 | Hasfjord | |
| 6,259,981 B1 | 7/2001 | Wilcosky | |
| 6,289,332 B2 | 9/2001 | Menig | |
| 6,429,845 B1 | 8/2002 | Unseld | |
| 6,587,767 B2 | 7/2003 | Letang | |
| 6,700,482 B2 | 3/2004 | Ververs | |
| 6,788,196 B2 | 9/2004 | Ueda | |
| 6,870,469 B2 | 3/2005 | Ueda | |
| 6,874,012 B1 | 3/2005 | St. Pierre | |
| 2007/0052703 A1 | 3/2007 | Seto | |
| 2007/0088481 A1 | 4/2007 | McCormick | |

* cited by examiner

*Primary Examiner*—Daryl Pope
(74) *Attorney, Agent, or Firm*—Christensen O'Connor Johnson Kindness PLLC

(57) ABSTRACT

A vehicle display system includes a plurality of sensors mounted to a vehicle for sensing vehicle operating conditions and a vehicle display controller in communication with the sensors. The controller is capable of receiving signals transmitted from the sensors and prioritizing vehicle operating conditions indicated by received signals according to predetermined criteria. The system further includes a display screen adapted to display warning signals according to signals received from the vehicle display controller. The display screen arranges the displayed warning signals according to one of a plurality of display masks. The display mask is determined by the number of displayed warning signals. The display mask has a first warning signal display area for displaying warning signals having priorities greater than a predetermined level and a second warning signal display area for displaying warning signals having priorities less than the predetermined level.

19 Claims, 4 Drawing Sheets

WARNING SIGNAL PRIORITY SCHEDULE

| PRIORITY # | WARNING SIGNAL | COLOR | SUPPRESSIBLE (VEHICLE MOVING) | SUPPRESSIBLE (VEHICLE STATIONARY) |
|---|---|---|---|---|
| 1 | STOP ENGINE | RED | NO | YES |
| 2 | KING PIN UNLOCKED | RED | NO | YES |
| 3 | HIGH EXHAUST TEMPERATURE (UNDER 10 MPH) | YELLOW | NO | YES |
| 4 | PARKING BRAKE (OVER 1.2 MPH) | RED | NO | YES |
| 5 | HIGH EXHAUST TEMPERATURE (OVER 10 MPH) | YELLOW | NO | YES |
| 6 | ACTIVATE REGENERATION | YELLOW | NO | YES |
| 7 | TRUCK ABS | YELLOW | NO | YES |
| 8 | TRAILER ABS | YELLOW | NO | YES |
| 9 | INTERAXLE DIFFERENTIAL LOCK (OVER 25 MPH) | YELLOW | NO | YES |
| 10 | CHECK ENGINE | YELLOW | YES | YES |
| 11 | LOW COOLANT | YELLOW | YES | YES |
| 12 | SUSPENSION DUMP | YELLOW | YES | YES |
| 13 | INTERAXLE DIFFERENTIAL LOCK (UNDER 25 MPH) | YELLOW | YES | YES |

*Fig. 2.*

ERROR HANDLING FOR MULTI-FUNCTIONAL DISPLAY

TECHNICAL FIELD

This disclosure relates in general to vehicle information displays and more specifically to error-handling messages for multi-function vehicle information displays.

BACKGROUND

Vehicle information displays are installed in dashboards and in other interior surfaces of vehicles to convey information to vehicle operators. Displayed information can include vehicle operating parameters such as vehicle speed, fuel level, engine temperature, oil pressure, parking brake engagement, and other information that would be of potential interest to a vehicle operator. In addition to informing the operator of vehicle parameters, information displays can also display warning signals when the operating parameters meet certain predetermined criteria. The displayed warning signals use icons, text, or both to alert the operator to the detected condition.

Warnings signals can indicate conditions of varying severity. For example, some warning signals, such as "Interaxle Diff Lock Under 25 MPH," "Check Engine," and "Low Coolant," indicate non-critical conditions that do not require immediate attention. Other warning signals, such as "Stop Engine," "King Pin Unlocked," and "Park Brake While Moving" indicate conditions that require the vehicle operator to take immediate action to avoid potentially unsafe operating conditions. In order to differentiate warning signals that indicate critical conditions from those that indicate non-critical conditions, warning signals are displayed in different colors. For example, critical warning signals are displayed in red, while non-critical warning signals are displayed in yellow.

As vehicles have become more complex, the number of operating conditions of which operators must be aware has increased substantially. As a result, at any given time, it may be necessary to display several warning signals. However, a problem exists in that the limitations in the display area size of known displays often precludes the display of all active warnings at a given time.

SUMMARY

A vehicle display system is disclosed, wherein the system is capable of displaying warning icons related to vehicle operating conditions. Vehicle operating conditions are detected by sensors mounted to the vehicle. The sensors transit the conditions to a vehicle display controller as electronic signals. The vehicle display controller also receives data bus messages, which are also electronic signals, from various vehicle systems. The vehicle display controller receives the electronic signals and determines the appropriate warning signals to be displayed on the screen of the vehicle display according to predetermined criteria. The vehicle display controller prioritizes the warning signals and transmits the prioritized warning signals to the display, which shows the prioritized warning signals.

In order to display the warning signals, in embodiments described herein, one of a plurality of masks is applied to the screen according to the number of warning signals to be displayed. The mask determines the size and location of each warning signal. Critical warning signals are displayed in a critical warning signal display area, and non-critical warning signals are displayed in a non-critical warning signal display area. Each warning signal is displayed in a color determined according to the priority of the indicated operating condition. The displayed warning signals are arranged within each warning signal display area according to priority so that the highest priority warning signals are displayed first.

It should be appreciated that this summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2 shows characteristics of warning signals displayed by the vehicle information display shown in FIG. 1;

DETAILED DESCRIPTION

Figure 1:
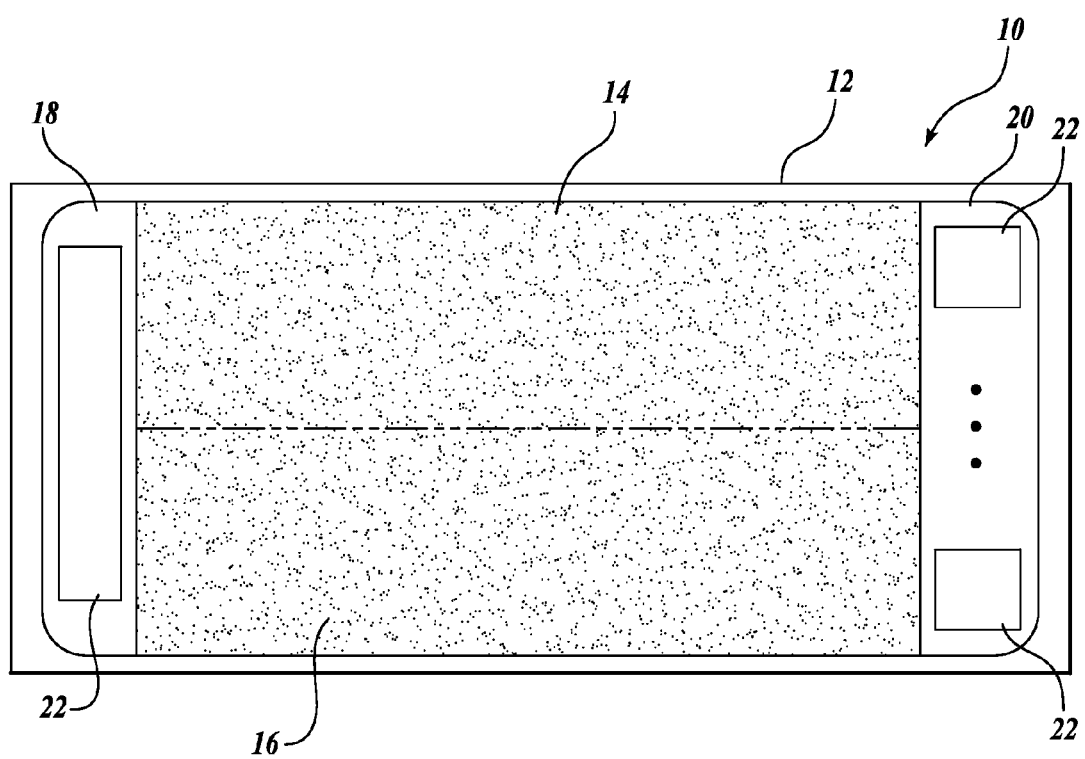
FIG. 1 shows one embodiment of a vehicle information display in accordance with aspects of the present disclosure.

A multi-functional vehicle information display 10 (the "display 10") constructed in accordance with one embodiment of the present disclosure is best seen by referring to FIG. 1. The display 10 is adaptable to be mounted in the dashboard or any other suitable interior surface of a vehicle. The display 10 is preferably located in a position that is visible to the vehicle operator during normal vehicle operation, but can be located in other areas of the vehicle interior, such as on the passenger side of the vehicle or in the sleeper compartment, if the vehicle is so equipped. The display 10 includes a screen 12 that has a matrix of pixels therein, wherein the pixels are capable of being selectively activated to form various images on the screen 12. Known screens of this type include, but are not limited to, screens that use liquid crystal diodes (LCDs), light emitting diodes (LEDs), and cathode ray tubes (CRTs).

Still referring to FIG. 1, the screen 12 comprises first and second display areas 14 and 16 in which warning signals are displayed. The screen further comprises first and second supplemental display areas 18 and 20. Supplemental information 22 related to the operation of the display 10, such as a display navigation menu, display status, and the total number of active warning signals may be shown in the supplemental display areas 18 and 20.

Figure 6:
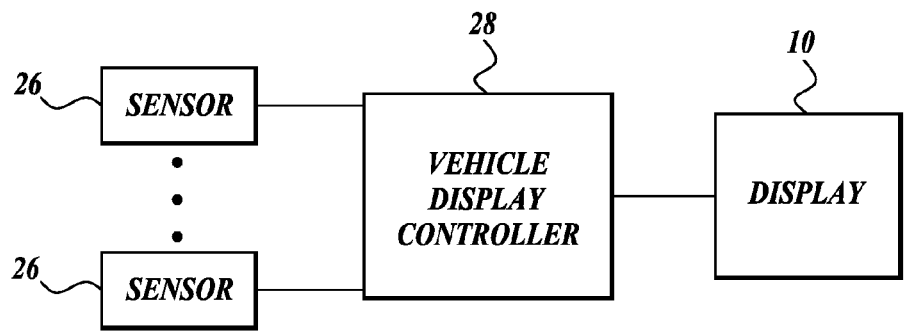
FIG. 6 shows a block diagram of the vehicle information display shown in FIG. 1.

The vehicle in which the display 10 is mounted includes a plurality of vehicle sensors 26. These sensors 26 shown in the block diagram of FIG. 6 may include, but are not limited to, sensors capable of sensing vehicle speed, fuel level, engine temperature, oil pressure, parking brake engagement, and any other information that would be of potential interest to a vehicle operator. The sensors 26 send electronic signals to a vehicle display controller 28. In one embodiment, the vehicle display controller 28 receives data bus messages from one or more electronic systems installed in the vehicle. These data bus messages can be in addition to or in lieu of the electronic signals received from the sensors 26.

The vehicle display controller 28 determines if the operating conditions meet predetermined criteria that require one or more warning signals to be displayed. When the vehicle display controller 28 determines that warning signals are to be displayed, the vehicle display controller 28 prioritizes the warning signals and sends the signals to the display 10. The display 10 then displays the appropriate warning signals and controls the appearance of the display 10 according to the number, types, and priority of warning signals to be displayed.

In several embodiments, warning signals may be prioritized according to predetermined criteria. FIG. 2 shows one embodiment of a warning signal priority schedule for a heavy duty vehicle, wherein warning signals are prioritized by the severity of the indicated condition. In the illustrated embodiment, the "Stop Engine" warning signal, which indicates that the vehicle operator should immediately stop the engine, is assigned the highest priority. Other critical warning signals, including "King Pin Unlocked," "High Exhaust Temperature" while the vehicle is traveling under 10 miles per hour, "Parking Brake" engaged while the vehicle is traveling over 1.2 miles per hour, and "High Exhaust Temperature" while the vehicle is traveling over 10 miles per hour are assigned successively lower priorities. Non-critical warning signals include "Active Regeneration" of the diesel particulate filter, "Truck ABS" engaged, "Trailer ABS" engaged, "Interaxle Differential Locked" while the vehicle is traveling over 25 miles per hour, "Check Engine," "Low Coolant," "Suspension Dump" when pressurized air is vented from the vehicle's air suspension, and "Interaxle Differential Locked" while the vehicle is traveling under 25 miles per hour. Like the critical warning signals, these non-critical warning signals are also prioritized relative to the other warning signals.

In order to make the critical warnings signals more readily distinguishable from the non-critical warning signals, critical warnings signals are generally displayed in red, while non-critical warning signals are generally displayed in yellow. It should be appreciated that while the color of a particular warning signal generally corresponds to the priority of that warning signal, in some embodiments, a critical warning signal may be displayed in yellow, or a non-critical warning signal may be displayed in red. Critical warning signals may be further emphasized using other means, such as displaying the critical warning signals with icons that are larger than those representing non-critical warning signals, displaying critical warning signals as blinking icons, and accompanying the display of a critical warning signal with a warning sound.

It should be noted that the warning signal priority schedule shown in FIG. 2 is illustrative in nature. It should be apparent to those of skill in the art that the number and type of warning signals may be varied without departing from the scope of the disclosure. Further, variations in the prioritization and display color of different warning signals are also within the scope of the disclosure.

Referring back to FIG. 1, the vehicle display controller 28 (FIG. 6) is capable of changing the layout of the screen 12 according to the number and type of warning signals being displayed at a particular time. In the embodiment shown in FIG. 3, when a single warning signal is displayed, the vehicle display controller 28 signals the first and second display areas 14 and 16 to display information according to a first mask 30. In one suitable embodiment, the first mask 30 comprises a warning signal display area 32 in which an icon or text representing the warning signal is displayed. In one suitable embodiment, the first mask 30 further includes first, second, third, and fourth text display areas 34, 36, 38, and 40 in which additional text or images can be displayed. The additional text or images may supplement the information displayed in the warning signal display area 32 or may provide additional, but unrelated, information. For example, if a "Stop Engine" warning signal is displayed, in the warning signal display area 32, a reasons such as "Low Oil Pressure" or "High Engine Temperature" may be displayed in one or more of the first, second, third, and fourth text display areas 34, 36, 38, and 40 to supplement the displayed warning signal. Alternately, information that is unrelated to the warning signal, such as time or temperature, may be displayed in one or more of the first, second, third, and fourth text display areas 34, 36, 38, and 40.

Figure 4:
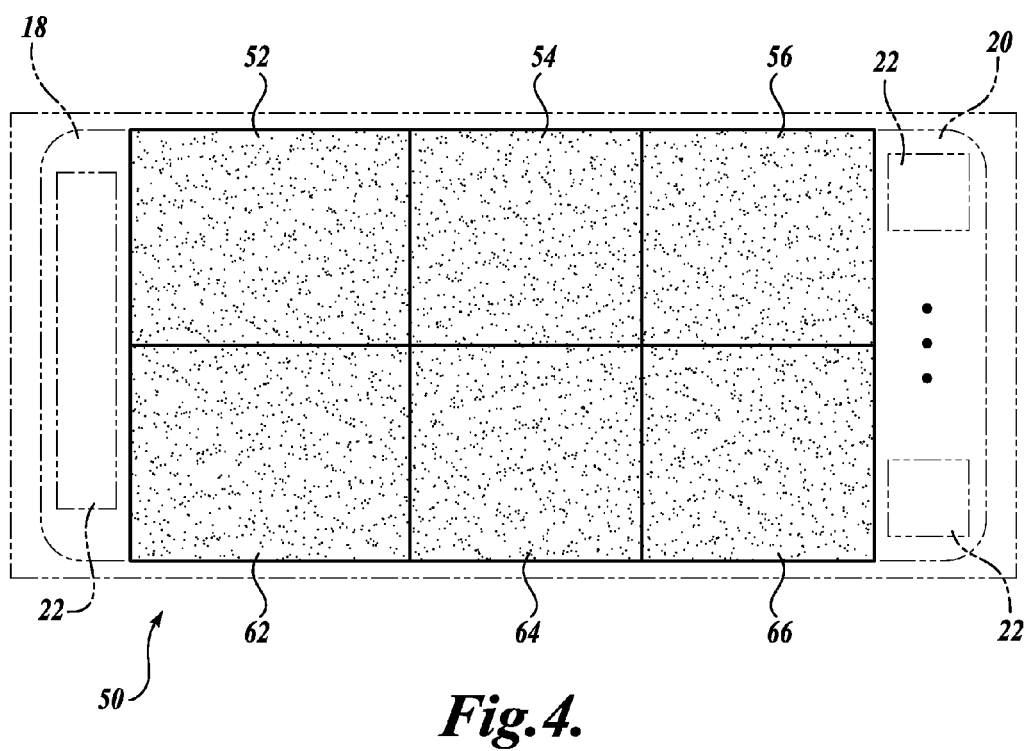
FIG. 4 shows a second exemplary mask for the vehicle information display shown in FIG. 1.

When more than one warning signal is displayed at a particular time, the vehicle display controller 28 signals the first and second display areas 14 and 16 to display information according to an exemplary second mask 50. As best shown in FIG. 4, one embodiment of the second mask 50 includes first, second, and third critical warning signal display areas 52, 54, and 56 in which icons or text representing critical warning signals are displayed in red. The second mask 50 further includes first, second, and third non-critical warning signal display areas 62, 64, and 66 in which icons or text representing non-critical warning signals are displayed in yellow.

Figure 3:
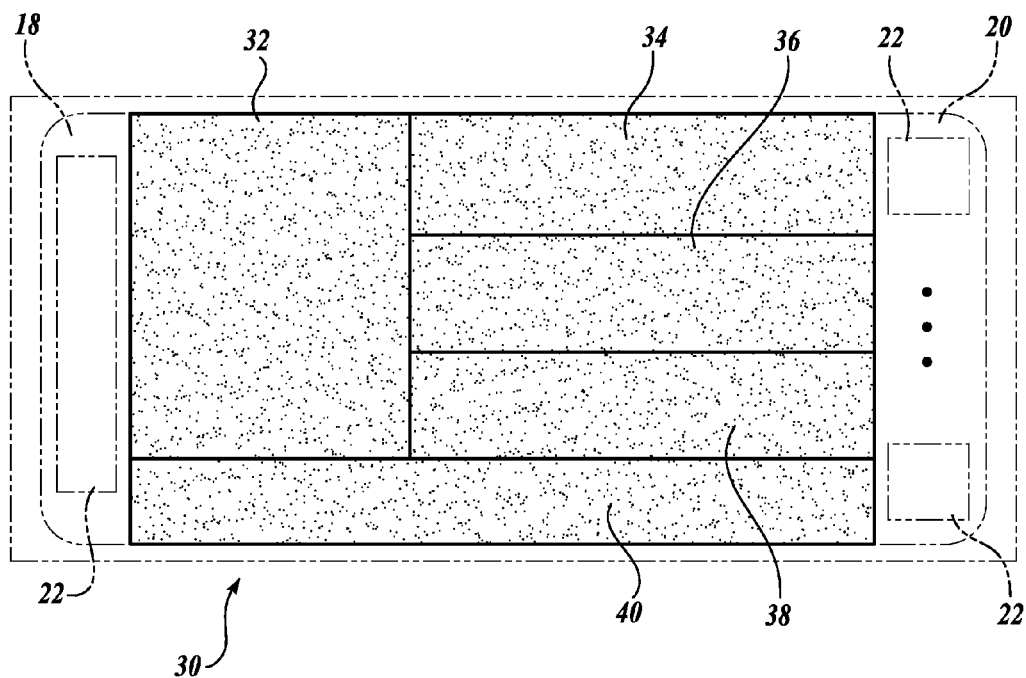
FIG. 3 shows a first exemplary mask for the vehicle information display shown in FIG. 1.

In the illustrated embodiment of FIG. 3, the warning signal display area 32 of the first mask 30 is larger than any of the critical or non-critical warning signal display areas 52, 54, 56, 62, 64, and 66 of the second mask 50 shown in FIG. 4. Thus, because only one warning signal is displayed when the first mask 30 is applied, the single warning signal is more prominently displayed. It should be apparent that the display 10 may include any number of masks to provide for different numbers of warning signals and different combinations of critical and non-critical warning signals. In addition, warning signal display areas may be of different sizes and colors in order to further emphasize higher priority warning signals and distinguish them from lower priority warning signals.

In practice, the display 10 operates to alert the vehicle operator of the highest priority operating conditions at any given time. When conditions are such that only one warning signal is required, the vehicle display controller 28 signals the first and second display areas 14 and 16 to display information according to the first mask 30. The warnings signal that represents the operating condition is displayed in the warning signal display area 32 of the first mask 30. When the warning signal is a critical warning signal, it is displayed in red. When the warning signal is a non-critical warning signal, it is displayed in yellow. Additional information regarding the warning signal may be optionally displayed in first, second, third, and fourth text display areas 34, 36, 38, and 40. It should be appreciated that warning signal colors are not limited to red and yellow, but may also include any number of additional or alternative colors.

In accordance with one embodiment, the initial display of a warning signal may include a "warning cycle" during which the warning signal flashes on and off for a predetermined period of time. The warning cycle may be accompanied by a warning sound to provide an additional indication that a warning cycle has commenced. After the warning cycle period has been completed, the warning sound ceases and the warning signal is displayed in a continuous state.

The single warning signal is displayed along with the first mask 30 until one of several events occurs. One such event is the termination of the condition that triggered the warning signal to be displayed. When the triggering condition ends, then the warning signal ceases to be displayed. Optionally, the display may require a manual reset to remove a displayed warning signal even though the triggering condition has ended.

A displayed warning signal may also be removed from the display 12 screen by manually suppressing the warning signal, even though the triggering condition is still present. As shown in the embodiment of FIG. 2, all of the warning signals can be manually suppressed when the vehicle is stationary. In contrast, only the lowest priority warning signals ("Check Engine," "Low Coolant," "Suspension Dump," and "Interaxle Differential Locked" while the vehicle is traveling under 25 miles per hour) can be suppressed while the vehicle is moving.

When conditions are such that multiple warning signals are required, the second mask 50 is applied to the screen 12. Referring to FIG. 2, critical warning signals are displayed in critical warning display areas 52, 54, and 56, and are arranged on the screen 12 according to priority. When conditions are such that there are more active critical warning signals than there are available critical warning display areas 52, 54, and 56, only the highest priority warning signals are displayed. The lower priority warning signals are not displayed until enough higher priority warning signals have been removed or suppressed so that the lower priority signals are among the highest remaining signals.

Non-critical warning signals are displayed in non-critical warning display areas 62, 64, and 66 by priority in a manner similar to the critical warning signals. That is, the non-critical warning signals are displayed according to priority. When there are more active non-critical warning signals than non-critical warning signal display areas 62, 64, and 66, only the highest priority non-critical warning signals are displayed on the screen 12. Lower priority non-critical warning signals are not displayed until higher priority non-critical warning signals have been removed or suppressed.

Figure 5:
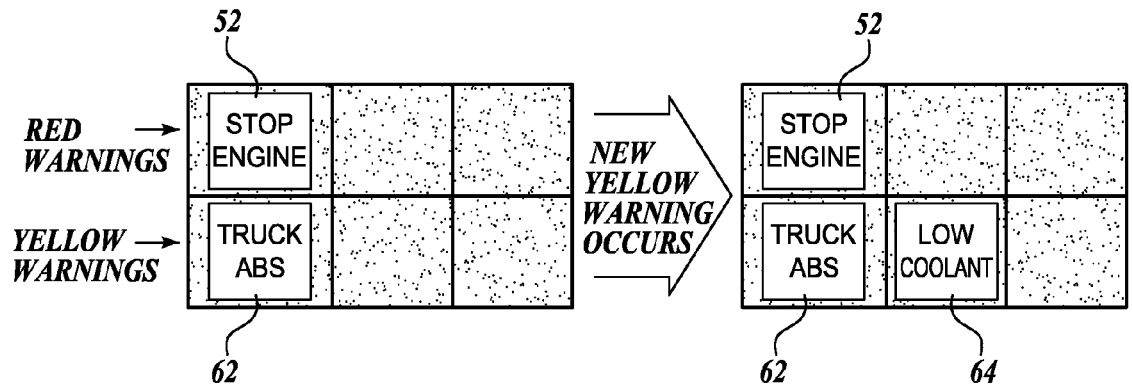
FIG. 5 shows the vehicle information display shown in FIG. 1 as the display changes from a first state to a second state.

FIG. 5 shows a sequence in which a non-critical warning signal is added to the screen 12. Initially, the second mask 50 is applied to the screen 12, and one critical warning signal ("Stop Engine") and one non-critical warning signal ("Truck ABS") are displayed. The critical warning signal is displayed in warning signal display areas 52 in red, and the non-critical warning signal is displayed in warning signal display area 62 in yellow. When a new non-critical warning signal ("Low Coolant") is required, the non-critical signal is displayed on the screen 12 so that the warning signals are arranged in order of priority. Because the "Low Coolant" warning signal has a lower priority than the "Truck ABS" warning signal, the "Truck ABS" warning signal remains in non-critical warning signal display area 62, and the "Low Coolant" warning signal is displayed in non-critical warning signal display area 64. If the "Truck ABS" warning signal had a lower priority than the "Low Coolant" warning signal, then the "Truck ABS" warning symbol would be moved to non-critical warning signal display area 64, and the "Low Coolant" warning signal would be displayed in non-critical warning signal display area 62.

Although lower priority warning signals are not displayed on the screen 12 when the warning signal display areas are occupied by warning signals having a higher priority, when a lower priority warning signal is added, the display 10 still undergoes a warning cycle for each new warning signal during which a warning sound is emitted. Thus, the vehicle operator is alerted to the presence of a new warning signal, even if the warning signal is not displayed on the screen 12. In one embodiment, the display 10 includes a manual scrolling feature. The manual scrolling feature allows the vehicle operator to view additional active warning signals that are not shown on the display by selectively scrolling all active warning signals across the display 10. In one embodiment, the active warning signals are scrolled across the display 10 sequentially, according to warning signal priority. The scrolling feature may be a dial, one or more buttons, toggle switches, a touch screen, or any other suitable means for allowing operator input.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle display system adapted to display one or more warning signals representing vehicle operating conditions, the display system comprising:
   (a) a plurality of sensors mounted to a vehicle for sensing vehicle operating conditions;
   (b) a vehicle display controller in communication with the plurality of sensors, the controller being capable of receiving signals transmitted from the plurality of sensors and prioritizing vehicle operating conditions indicated by received signals according to predetermined criteria; and
   (c) a display screen adapted to display warning signals according to signals received from the vehicle display controller, each warning signal indicating a vehicle operating condition, the display screen being adapted to arrange the displayed warning signals according to one of a plurality of display masks, the display mask being determined by the number of displayed warning signals, wherein the display mask has a first warning signal display area for displaying warning signals having priorities greater than a predetermined level and a second warning signal display area for displaying warning signals having priorities less than the predetermined level.

2. The vehicle display system of claim 1, wherein warning signals displayed in the first warning signal display area are located relative to other warning signals displayed in the first warning signal display area according to the relative priority of each warning signal.

3. The vehicle display system of claim 2, wherein the first warning signal display area is capable of displaying a predetermined number of warning signals at a particular time, said first warning signal display area displaying the warning signals having higher priority among active warning signals when a number of active warning signals is greater than the predetermined number of warning signals and not displaying warning signals having lower priority among active warning signals.

4. The vehicle display system of claim 3, wherein the system further includes a scrolling means, said scrolling means adapted to sequentially display each active warning signal on the display when the number of active warning signals is greater than the predetermined number of warning signals.

5. The vehicle display system of claim 1, wherein at least one of the displayed warning signals is selectively removable from the display when the vehicle is stationary.

6. The vehicle display system of claim 5, wherein the at least one displayed warning signal is not selectively removable from the display when the vehicle is moving.

7. The vehicle display system of claim 1, wherein warning signals are displayed in a color determined according to the priority of the indicated operating condition.

8. The vehicle display system of claim 7, wherein warning signals having priorities greater than the predetermined level are displayed in red and warning signals having priorities less than the predetermined level are displayed in yellow.

9. The vehicle display system of claim 1, wherein a newly sensed condition initiates a warning cycle lasting a predetermined amount of time, a warning signal being added to the first warning signal display area during the warning cycle.

10. The vehicle display system of claim 9, wherein the added warning signal continuously flashes on and off during the warning cycle.

11. The vehicle display system of claim 9, wherein the display emits a warning sound during the warning cycle.

12. The vehicle display system of claim 1, wherein the vehicle display controller is adapted to receive data bus messages from an electronic system installed in the vehicle, the data bus messages being indicative of at least one vehicle operating condition.

13. A method for displaying vehicle operating conditions on a display screen, the method comprising:
   (a) receiving a signal from a sensor indicative of a vehicle operating condition;
   (b) prioritizing the vehicle operating condition according to a predetermined criteria;
   (c) displaying a warning signal representing the vehicle operating condition on the display screen, the warning signal being displayed in a color according to the priority of the operating condition, the display screen having a layout selected from a plurality of layouts, the layout being determined according to the number of warning signals being displayed and changes as the number of displayed warning signals changes, wherein displayed warning signals of a first color are displayed in a first warning signal display area of the display screen, and warning signals of a second color are displayed in a second warning signal display area of the display screen.

14. The method of claim 13, wherein the step of displaying a warning signal further includes positioning warning signals displayed in the first warning signal display area relative to other warning signals displayed in the first warning signal display area according to the relative priority of each warning signal.

15. The method of claim 13, wherein at least one displayed warning signal is selectively removable from the display when the vehicle is stationary.

16. The method of claim 15, wherein the at least one selectively removable warning signal is not selectively removable when the vehicle is moving.

17. The method of claim 13, wherein the step of displaying a warning signal further includes initiating a warning cycle lasting a predetermined amount of time, and a warning signal is added to the first warning signal display area during the warning cycle.

18. The method of claim 17, wherein the added warning signal continuously flashes on and off during the warning cycle.

19. The method of claim 17, wherein the step of displaying a warning signal further includes emitting a warning sound during the warning cycle.

* * * * *